US012375352B2

(12) United States Patent
Shete et al.

(10) Patent No.: US 12,375,352 B2
(45) Date of Patent: Jul. 29, 2025

(54) NETWORK AWARE COMPUTE RESOURCE MANAGEMENT USE CASE FOR O-RAN Non-RT RIC

(71) Applicant: RAKUTEN MOBILE, INC., Tokyo (JP)

(72) Inventors: Pankaj Shete, Tokyo (JP); Awn Muhammad, Tokyo (JP); Mohit Luthra, Singapore (SG)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/012,129

(22) PCT Filed: Sep. 21, 2022

(86) PCT No.: PCT/US2022/044182
§ 371 (c)(1),
(2) Date: Dec. 21, 2022

(87) PCT Pub. No.: WO2023/177419
PCT Pub. Date: Sep. 21, 2023

(65) Prior Publication Data
US 2024/0106709 A1 Mar. 28, 2024

(30) Foreign Application Priority Data

Mar. 15, 2022 (SG) .......................... 10202202626V

(51) Int. Cl.
*H04L 41/0823* (2022.01)
*H04L 41/0631* (2022.01)
(Continued)

(52) U.S. Cl.
CPC ...... *H04L 41/0823* (2013.01); *H04L 41/0631* (2013.01); *H04L 41/0894* (2022.05); *H04L 41/0895* (2022.05); *H04L 41/16* (2013.01)

(58) Field of Classification Search
None
See application file for complete search history.

(56) References Cited

U.S. PATENT DOCUMENTS 11,652,691 B1 * 5/2023 Ramalingam ....... H04L 43/0888
709/221
11,737,122 B1 * 8/2023 Cai ......................... H04L 67/60
370/259
(Continued)

FOREIGN PATENT DOCUMENTS

KR 10-2021-0117960 A 9/2021
TW 201711425 A 3/2017
(Continued)

OTHER PUBLICATIONS

KR-20210117960 A with English Translation (SOURCE = FIT) (Year: 2021).*
(Continued)

*Primary Examiner* — Sandarva Khanal
(74) *Attorney, Agent, or Firm* — Sughrue Mion, PLLC

(57) ABSTRACT

A method for optimizing Open Radio Access Network (O-RAN) Cloud (O-Cloud) resources using rApps of a Non-RT RIC is provided. The method includes: obtaining, by an rApp hosted in the Non-RT RIC, O1 data received over an O1 interface of an SMO framework for managing and orchestrating an O-Cloud platform, the O1 interface for communication with virtualized network functions (VNFs) hosted in a plurality of physical nodes of the O-Cloud platform; obtaining, by the rApp, O2 data received over an O2 interface of the SMO framework, the O2 interface for communication with Infrastructure Management Services (IMS) and Deployment Management Services (DMS) of the O-Cloud platform; and generating, by the rApp and based on at least one of the O1 data and the O2 data, a policy for (Continued)

optimizing the O-Cloud platform or the VNFs via SMO anchored functionalities or the O1 interface of the SMO framework.

15 Claims, 10 Drawing Sheets

(51) Int. Cl.
  *H04L 41/0894* (2022.01)
  *H04L 41/0895* (2022.01)
  *H04L 41/16* (2022.01)

(56) References Cited

U.S. PATENT DOCUMENTS

| | | | | |
|---|---|---|---|---|
| 12,082,006 | B2* | 9/2024 | Wang | H04W 24/10 |
| 12,127,059 | B2* | 10/2024 | Melodia | H04B 17/336 |
| 2016/0373474 | A1* | 12/2016 | Sood | G06F 21/53 |
| 2021/0184989 | A1 | 6/2021 | Wu et al. | |
| 2021/0243839 | A1* | 8/2021 | Krishnaswamy | H04W 24/04 |
| 2021/0258866 | A1* | 8/2021 | Chou | H04W 48/16 |
| 2021/0258969 | A1* | 8/2021 | Yang | H04W 72/54 |
| 2022/0167236 | A1* | 5/2022 | Melodia | H04W 28/24 |

FOREIGN PATENT DOCUMENTS

| | | | | |
|---|---|---|---|---|
| WO | WO-2020242987 A1 * | 12/2020 | | H04W 24/02 |
| WO | WO-2021089114 A1 * | 5/2021 | | G06F 9/45558 |
| WO | WO-2021152630 A1 * | 8/2021 | | H04W 16/14 |
| WO | WO-2022060923 A1 * | 3/2022 | | G06N 20/00 |
| WO | WO-2023091664 A1 * | 5/2023 | | G06N 3/092 |

OTHER PUBLICATIONS

O-Ran Alliance; Technical Specification # O-RAN.WG6.O2-GA&P-v01.01; published in 2021; "O-RAN O2 Interface: General Aspects and Principles" (Year: 2021).*
International Search Report issued Feb. 28, 2023 in International Application No. PCT/US22/44182.
Written Opinion issued Feb. 28, 2023 in International Application No. PCT/US22/44182.
"O-RAN Operations and Maintenance Architecture", O-RAN Alliance, 0-RAN.WG1.0AM-Architecture-v04.00, 2021, pp. 1, 39-42 (7 pages total).

* cited by examiner

NETWORK AWARE COMPUTE RESOURCE MANAGEMENT USE CASE FOR O-RAN Non-RT RIC

BACKGROUND

A radio access network (RAN) is an important component in a telecommunications system, as it connects end-user devices (or user equipment) to other parts of the network. The RAN includes a combination of various network elements (NEs) that connect end-users to a core network. Traditionally, hardware and/or software of a particular RAN is vendor specific.

Open RAN (O-RAN) technology has emerged to enable multiple vendors to provide hardware and/or software to a telecommunications system. Since different vendors are involved, the type of hardware and/or software provided may also be different. That is, different types of NEs may be provided by different vendors, and depending on the specific service, the NE could be virtualized in software form (e.g., virtual machine (VM)-based), or could be in physical hardware form (e.g., non-VM based).

RAN functions in the O-RAN architecture are controlled and optimized by a RAN Intelligent Controller (RIC). The RIC is a software-defined component that implements modular applications to facilitate the multivendor operability required in the O-RAN system, as well as to automate and optimize RAN operations.

The RIC is divided into two types: a non-real-time RIC (Non-RT RIC) and a near-real-time RIC (Near-RT RIC). The Non-RT RIC operates on a timescale greater than 1 second within the Service Management and Orchestration (SMO) framework. Its functionalities are implemented through modular applications called rApps, and include: providing policy based guidance and enrichment across the A1 interface, which is the interface that enables communication between the Non-RT RIC and the Near-RT RIC; performing data analytics; Artificial Intelligence/Machine Learning (AI/ML) training and inference for RAN optimization; and/or recommending configuration management actions over the O1 interface, which is the interface that connects the SMO to RAN managed elements (e.g., Near-RT RIC, O-RAN Centralized Unit (O-CU), O-RAN Distributed Unit (O-DU), etc.).

The Near-RT RIC operates on a timescale between 10 milliseconds and 1 second and is coupled with the O-CU control plane (O-CU-CP) and the O-CU user plane (O-CU-UP) via the E2 interface. It hosts xApps to implement functions such as interference mitigation, load balancing, security, etc. The two types of RICs work together to optimize the O-RAN. For example, the Non-RT RIC provides the policies, data, and AI/ML models enforced and used by the Near-RT RIC for RAN optimization.

As mentioned above, the Non-RT RIC is located within the SMO framework, which manages and orchestrates RAN elements. Specifically, the SMO manages and orchestrates what is referred to as the O-Ran Cloud (O-Cloud). The O-Cloud is a collection of physical RAN nodes that host the RICs, O-CUs, and O-DUs, the supporting software components (e.g., the operating systems and runtime environments), and the SMO itself. In other words, the SMO manages the O-Cloud from within.

In further detail, the O-RAN E2 nodes (i.e., the O-CU, O-DU, etc., that are connected to the Near-RT RIC via the E2 interface) are orchestrated on the O-Cloud as Virtualized Network Functions (VNFs). SMO anchored functionalities (Network Function Orchestrator (NFO), Federated O-Cloud Orchestration and Management (FOCOM), etc.) handle management and orchestration of VNFs and the O-Cloud. In the related art, however, SMO anchored functionalities are limited to utilizing intelligence by correlation of observability from E2 nodes, infrastructure, and network functions (NFs) for influencing management/orchestration. O-Cloud resources cannot be optimized based on intents (e.g., policy goals for NFO/FOCOM) or through configuration changes over the O2 interface (i.e., the interface between the SMO and the O-Cloud) from Non-RT RIC rApps. That is, in the related art, rApps of the Non-RT RIC do not have a scope for optimizing or influencing orchestration and management of the O-Cloud or operation and maintenance of O-RAN elements. Nor has any use case been defined that utilizes intelligence through rApps with the help of AI/ML for optimizing or influencing orchestration and management of the O-Cloud or operation and maintenance of O-RAN elements.

SUMMARY

According to example embodiments, systems and methods are provided that utilize one or more rApps of the Non-RT RIC to optimize O-Cloud resources.

According to example embodiments, systems and methods are provided that enable the Non-RT RIC to provide intelligence to O-Cloud operations and functionalities through optimizing O-Cloud resources.

According to example embodiments, a system for optimizing O-Cloud resources, includes: an O-RAN Cloud platform (O-Cloud) including a plurality of physical nodes configured to host virtualized network functions (VNFs), the VNFs including O-RAN centralized units (O-CUs) and O-RAN distributed units (O-DUs); a Service Management and Orchestration (SMO) framework configured to manage and orchestrate the O-Cloud, the SMO including anchored functionalities, a non-real-time radio access network (RAN) intelligent controller (Non-RT RIC), an O1 interface for communication with the VNFs and an O2 interface for communication with Infrastructure Management Services (IMS) and Deployment Management Services (DMS) of the O-Cloud; and a near-real-time RAN intelligent controller (Near-RT RIC) configured to perform RAN optimization using policies and data provided by the Non-RT RIC, wherein the Non-RT RIC is configured to implement one or more applications (rApps) to: collect O-Cloud inventory and telemetry data on node level or O-Cloud level over the O2 interface, collect cellwise traffic data, including mobility and neighbor cell load data, over the O1 interface, train and deploy an artificial intelligence/machine learning (AI/ML) model to generate policies based on collected O1 and O2 data, and generate policies for the O-Cloud or VNFs based on at least one of priority, load, and energy consumption, and wherein the anchored functionalities of the SMO framework are configured to receive and manage the policies for the O-Cloud from the Non-RT RIC, and generate optimization controls for transmission to the O-Cloud via the O2 interface and/or transmit the policies to the IMS and DMS via the O2 interface for implementation.

The anchored functionalities of the SMO framework may include a Network Function Orchestrator (NFO) and a Federated O-Cloud Orchestration and Management (FOCOM).

According to example embodiments, a system for implementing a Service Management and Orchestration (SMO) framework for managing and orchestrating an Open Radio Access Network (O-RAN) Cloud (O-Cloud) platform, includes: at least one memory storing first instructions and second instructions; at least one first processor configured to execute the first instructions to implement a non-real-time radio access network (RAN) intelligent controller (Non-RT RIC) hosting a plurality of applications (rApps); and at least one second processor configured to execute the second instructions to implement SMO anchored functionalities, wherein the at least one first processor is configured to execute the first instructions to: obtain O1 data received over an O1 interface of the SMO framework, the O1 interface for communication with virtualized network functions (VNFs) hosted in a plurality of physical nodes of the O-Cloud platform, obtain O2 data received over an O2 interface of the SMO framework, the O2 interface for communication with Infrastructure Management Services (IMS) and Deployment Management Services (DMS) of the O-Cloud platform, and generate, by an rApp from among the plurality of applications and based on at least one of the obtained O1 data and the obtained O2 data, a policy for optimizing the O-Cloud platform or the VNFs via the SMO anchored functionalities or the O1 interface of the SMO framework, and wherein the at least one second processor is configured to execute the second instructions to receive and manage the policy from the Non-RT RIC, and generate optimization controls for transmission to the O-Cloud platform via the O2 interface or transmit the policy to the IMS and DMS via the O2 interface for implementation.

The at least one first processor may be configured to execute the first instructions to train and deploy at least one artificial intelligence/machine learning (AI/ML) model to generate the policy based on the at least one of the obtained O1 data and the obtained O2 data.

The at least one first processor may be configured to execute the first instructions to obtain feedback from the O-Cloud platform or the VNFs to evaluate the policy.

The O2 data may include O-Cloud inventory and telemetry data on node level or O-Cloud level.

The O1 data may include fault, configuration, accounting, performance, security (FCAPS) data.

The SMO anchored functionalities may include a Network Function Orchestrator (NFO) and a Federated O-Cloud Orchestration and Management (FOCOM).

The at least one of the obtained O1 data and the obtained O2 data may include data on at least one of central processing unit (CPU) utilization for network functions (NFs), bare metal power consumption, CPU load, memory load, and CPU frequency; and the policy may be a policy for energy savings for at least one of NFs, O-Cloud infrastructure, and O-Cloud hardware.

The at least one of the obtained O1 data and the obtained O2 data may include data on at least one of user mobility performance, traffic distribution among cells, neighbor cell measurements, NF configurations, NF inventory, and NF telemetry; and the policy may be a policy for RAN network or infrastructure load balancing.

The at least one of the obtained O1 data and the obtained O2 data may include data on at least one of network slice utilization, network slice throughput, network slice availability, and network slicing life cycle management (LCM); and the policy may be a policy for dynamic allocation and optimization of O-Cloud resources for network slicing.

The at least one of the obtained O1 data and the obtained O2 data may include RAN sharing-related FCAPS data; and the policy may be a policy for O-Cloud resource management and service legal agreement (SLA) assurance for RAN sharing.

The at least one of the obtained O1 data and the obtained O2 data may include at least one of O-Cloud fault data, O-Cloud performance data, NF fault data, and NF performance data; and the policy may be a policy for O-Cloud or O-Cloud infrastructure network elements healing or root cause analysis of performance degradation or faults.

According to example embodiments, a method for optimizing O-Cloud resources using policy-based guidance from a Non-RT RIC, includes: obtaining, by an application (rApp) hosted in the Non-RT RIC, O1 data received over an O1 interface of an SMO framework for managing and orchestrating an Open Radio Access Network (O-RAN) Cloud (O-Cloud) platform, the O1 interface for communication with virtualized network functions (VNFs) hosted in a plurality of physical nodes of the O-Cloud platform; obtaining, by the rApp, O2 data received over an O2 interface of the SMO framework, the O2 interface for communication with Infrastructure Management Services (IMS) and Deployment Management Services (DMS) of the O-Cloud platform; and generating, by the rApp and based on at least one of the obtained O1 data and the obtained O2 data, a policy for optimizing the O-Cloud platform or the VNFs via SMO anchored functionalities or the O1 interface of the SMO framework; and providing the policy to SMO anchored functionalities for implementation, or performing configuration changes for optimizing the O-Cloud resources via the O2 interface.

The method may further include training and deploy at least one artificial intelligence/machine learning (AI/ML) model to generate the policy based on the at least one of the obtained O1 data and the obtained O2 data.

The method may further include obtaining, by the rApp, feedback from the O-Cloud platform or the VNFs to evaluate the policy.

The O2 data may include O-Cloud inventory and telemetry data on node level or O-Cloud level.

The O1 data may include fault, configuration, accounting, performance, security (FCAPS) data.

According to example embodiments, at least one non-transitory computer-readable recording medium has recorded thereon instructions executable by at least one processor to perform a method for optimizing O-Cloud resources using policy-based guidance from a Non-RT RIC, the method including: obtaining, by an application (rApp) hosted in the Non-RT RIC, O1 data received over an O1 interface of an SMO framework for managing and orchestrating an Open Radio Access Network (O-RAN) Cloud (O-Cloud) platform, the O1 interface for communication with virtualized network functions (VNFs) hosted in a plurality of physical nodes of the O-Cloud platform; obtaining, by the rApp, O2 data received over an O2 interface of the SMO framework, the O2 interface for communication with Infrastructure Management Services (IMS) and Deployment Management Services (DMS) of the O-Cloud platform; generating, by the rApp and based on at least one of the obtained O1 data and the obtained O2 data, a policy for optimizing the O-Cloud platform or the VNFs via SMO anchored functionalities or the O1 interface of the SMO framework; and providing the policy to SMO anchored functionalities for implementation, or performing configuration changes for optimizing the O-Cloud resources via the O2 interface.

The method may further include training and deploy at least one artificial intelligence/machine learning (AI/ML) model to generate the policy based on the at least one of the obtained O1 data and the obtained O2 data.

The method may further include obtaining, by the rApp, feedback from the O-Cloud platform or the VNFs to evaluate the policy.

The O2 data may include O-Cloud inventory and telemetry data on node level or O-Cloud level.

The O1 data may include fault, configuration, accounting, performance, security (FCAPS) data.

BRIEF DESCRIPTION OF THE DRAWINGS

Features, advantages, and significance of exemplary embodiments of the disclosure will be described below with reference to the accompanying drawing.

DETAILED DESCRIPTION

Figure 1:
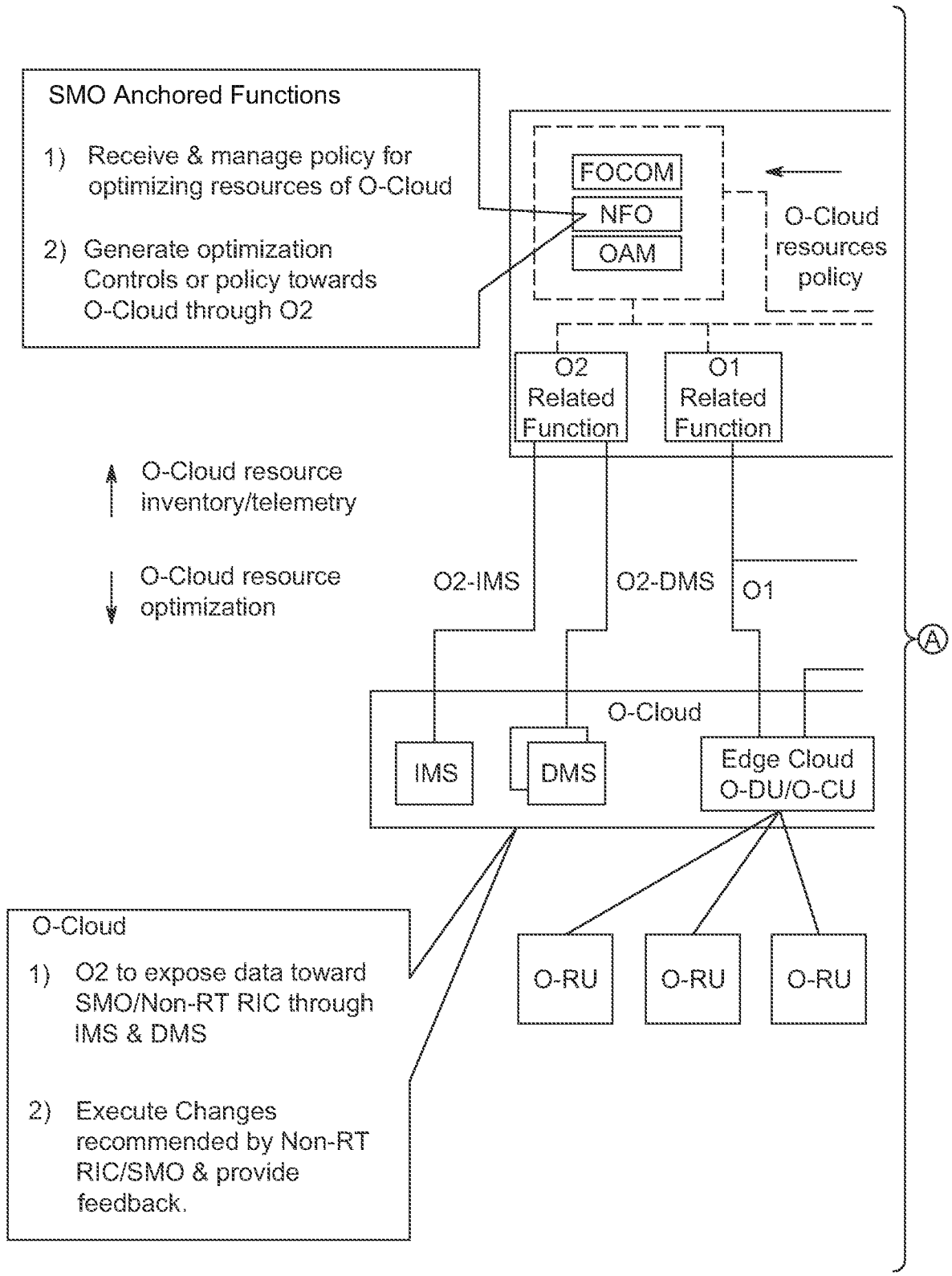
FIG. 1 is a diagram of an O-RAN system architecture according to example embodiments.
Figure 1:
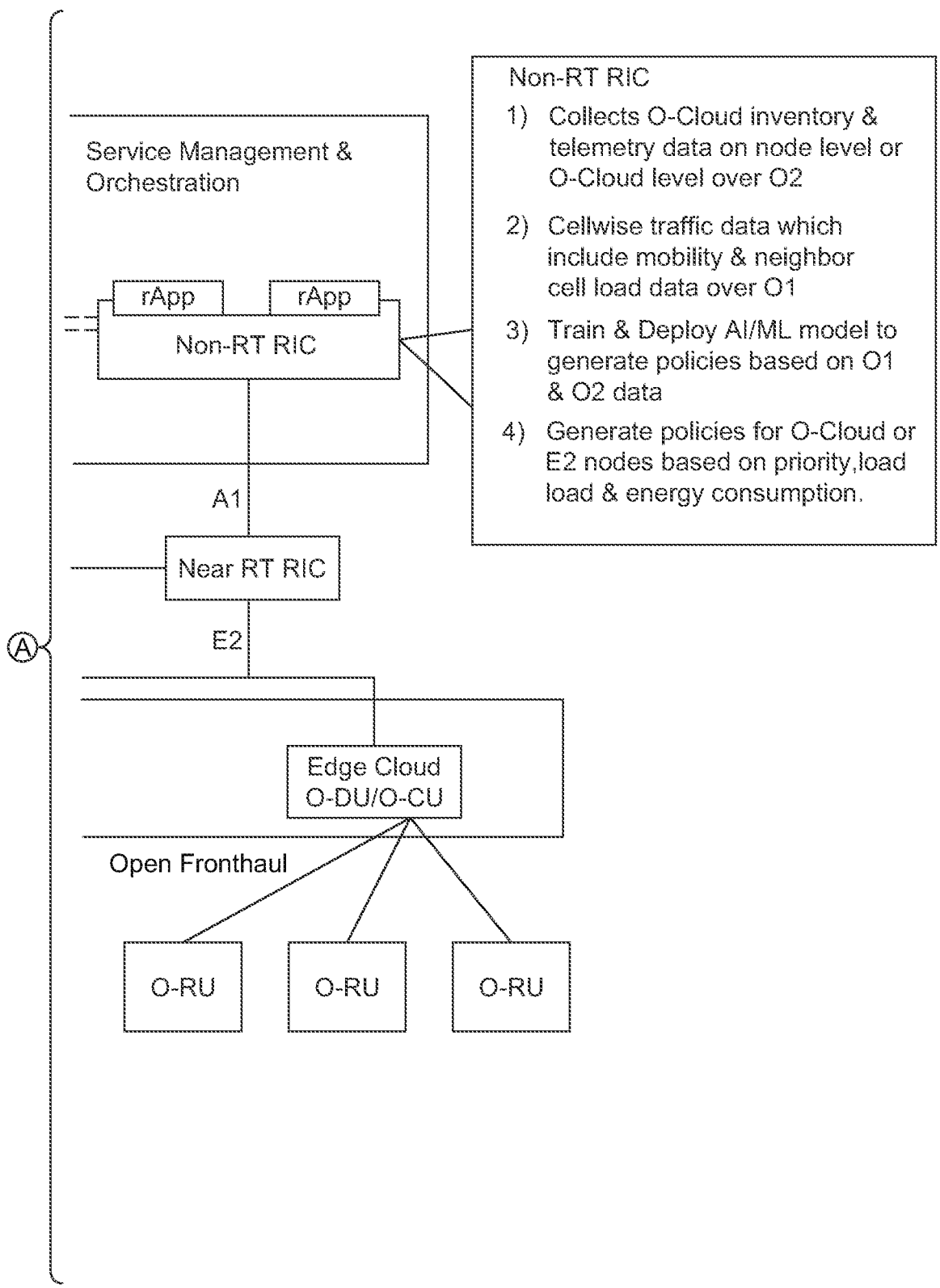

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide systems and methods that utilize one or more rApps of the Non-RT MC to optimize O-Cloud resources via the SMO's anchored functionalities and/or the O2 interface. Example embodiments of the present disclosure provide systems and methods that enable the Non-RT RIC to provide intelligence to O-Cloud operations and functionalities through optimizing O-Cloud resources.

FIG. 1 is a diagram of an O-RAN system architecture according to example embodiments. Referring to FIG. 1, the O-RAN system architecture includes an SMO framework, a Near-RT RIC, and an O-Cloud. The SMO framework includes anchored functionalities (SMO/NFO/OAM) and a Non-RT RIC.

According to example embodiments, the Non-RT RIC hosts third party applications as rApps in the SMO which can read various observability data through O1 and O2 related services. These third party rApps can be leveraged to provide policy-based guidance via NFO/FOCOM or Configuration Management (CM) changes directly via the O2 interface for optimization of O-Cloud resources.

In particular, the Non-RT RIC framework in accordance with one or more example embodiments can collect O-Cloud inventory and telemetry data on the node level or the O-Cloud level over the O2 interface, can collect cellwise traffic data (including mobility and neighbor cell load data) over the O1 interface, can train and deploy AI/ML models to generate policies based on the O1 and O2 data, can generate policies for O-Cloud or E2 nodes based on priority, load, and energy consumption, and can provide the policies for optimization of O-Cloud resources via the SMO anchored functionalities and/or as CM changes directly via the O2 interface.

The SMO anchored functionalities in accordance with one or more example embodiments are configured to receive and manage policies from the rApps for optimizing resources of the O-Cloud and generating optimization controls or policies for the O-Cloud through the O2 interface. The O-Cloud services (e.g., IMS and DMS) expose data toward the SMO and Non-RT RIC via the O2 interface, and the O-Cloud execute changes and recommendations by the Non-RT RIC and/or SMO and provide feedback thereto.

According to one or more example embodiments, third party rApps can influence automation and/or optimization aspects of the O-Cloud Infrastructure Life Cycle Management (LCM), such as energy savings (e.g., with the use of rApps/AI/ML, correlation between real time Load Prediction, network function (NF) performance and O-cloud performance data, etc.), hardware (HW) healing (e.g., restart of HW) and automated maintenance, security (e.g., password change), root cause analysis, etc.

Further, according to one or more example embodiments, third party rApps can influence O-Cloud deployment LCM, such as healing of NFs (e.g., restart, relocate, re-instantiate, etc.), scaling in/out in horizontal scaling (e.g., scaling in/out of NFs based on configuration and load related data from O-Cloud and E2 Nodes to improve efficiency in terms of load balancing and energy saving), scaling up/down in vertical scaling, health/state checks (e.g., auditing, reconciliating of real time state, health of NFs, etc.), diagnostics, etc.

Moreover, according to one or more example embodiments, third party rApps can influence O-Cloud provisioning in terms of capacity, availability, etc., as well as O-Cloud inventory in terms of the mapping of resources to their use.

Additionally, third party rApps according to one or more example embodiments can influence Assist Acceleration Abstraction Layer Interface (AALI) and Acceleration Abstraction Layer (AAL)-Logical Profile Unit (LPU) management aspects. Here, the LPU is a logical representation of resources within an instance of a HW Accelerator (e.g., there can be multiple processing units or subsystems on a hardware accelerator, or resource partitioning (hard—dedicated resources, soft—soft resources) and these can be logically represented as a AAL Logical Processing Unit).

According to example embodiments, the third party rApps can influence the above functions with the help of (or based on) data over O2 and O1 such as O2-IMS related data (e.g., O2ims_InfrastructureInventory Services, O2ims_InfrastructureMonitoring Services, O2ims_Infrast- ructure-Provisioning Services, O2ims_InfrastructureLifecycleManagement Services, etc.), O2-DMS related data (e.g., Deployment Lifecycle Management Services, Deployment Monitoring Services, etc.), and O1 FCAPS (fault, configuration, accounting, performance, security) data. Using this data, correlation between the deployed NF events and underneath or underlying O-Cloud events can be performed to find out or analyze the root cause and take wise and/or intelligence-driven actions towards the NFs and O-Cloud. As a result, the rApps according to example embodiments can make the O-Cloud more operator driven.

According to example embodiments, rApps can provide policy-based guidance for action and/or intent management via SMO anchored functionalities. In this regard, the NFO takes care of LCM actions for NFs. By way of example, an rApp in accordance with an embodiment can pass an intent (i.e., policy or policy goal) to the NFO, which shall guide to perform action toward deployment management services (DMS) for NFs. For example, in the case of NF healing scenarios, an rApp can assist the NFO to restart, relocate, and/or re-instantiate NFs.

Further, the FOCOM takes care of LCM of the O-Cloud. By way of example, an rApp in accordance with an embodiment can pass an intent to the FOCOM to guide to perform action towards the WIS. For example, an rApp can assist in case of root cause analysis of failure in the O-Cloud related to hardware or software based on observability correlation.

According to one or more example embodiments, rApps can configure changes over the O2 interface. To this end, an rApp can provide fast and continuous actions with low latency towards the O-Cloud, such as changing the P-state or C-state of the vCPU when required or desired for energy saving purposes.

Aspects of example embodiments provide O-Cloud orchestration and management that is more interoperable with the use of third-party applications (rApps) and AI/ML as an intelligent input to the NFO/FOCOM or direct input via the O2 Interface.

Use Cases for O-Cloud Resource Optimization

Hereinbelow, uses cases for O-Cloud resource optimization according to various example embodiments are described.

1.0 Use Case 1: O-Cloud Energy Saving

An O-Cloud energy saving use case in accordance with an example embodiment allows operators to define different objectives for energy saving of various components of O-RAN elements such as NFs deployed over the O-Cloud, O-Cloud Infrastructure, O-Cloud underneath hardware, etc.

1.1 Background and Goal of this Use Case

Energy consumption of mobile networks is a key topic for mobile operators. Energy Saving (ES) features involve different network mechanisms, network nodes and layers, operating at different time scales. Certain ES features are already deployed in network equipment and are vendor specific.

An ES use case in accordance with example embodiments provides various options over the Non-RT RIC platform and rApps to enable energy saving features for RAN NFs deployed over the O-Cloud, O-Cloud Infrastructure, O-Cloud underneath hardware.

1.2 Entities/Resources Involved in this Use Case

The entities involved in the ES use case include SMO anchored functionalities (NFO/FOCOM/OAM (Operations and Maintenance)), which support interpretation and enforcement of policies from the Non-RT RIC, and provide necessary control to O-Cloud elements (IMS and DMS) based on a policy from the Non-RT RIC. Further, at least one rApp and the Non-RT RIC framework retrieve necessary performance, configuration, and other data from the O-Cloud over the O2 interface and/or the O1 interface to define and update policies for energy savings to SMO anchored functionalities. The O-Cloud (IMS and DMS) in accordance with the present example embodiment is configured to read control data from SMO anchored functions, enforce changes to respective nodes or hardware underneath, and provide feedback to the SMO post control enforcement.

1.3 Solution Method

Figure 2:
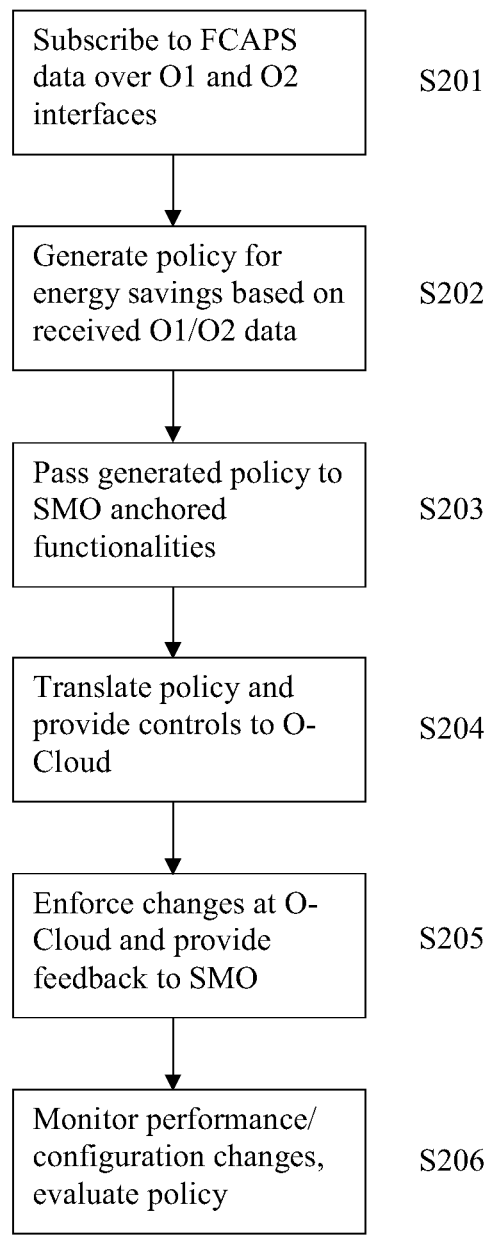
FIG. 2 illustrates a flowchart of a method of providing energy savings policy-based guidance for O-Cloud components from the Non-RT RIC via SMO anchored functionalities, in accordance with an example embodiment.

FIG. 2 illustrates a flowchart of a method of providing energy savings policy-based guidance for O-Cloud components (e.g., NFs deployed over the O-Cloud, O-Cloud Infrastructure, underlying O-Cloud hardware) from the Non-RT RIC via SMO anchored functionalities, in accordance with an example embodiment.

Referring to FIG. 2, at step S201, an rApp (i.e., one or more rApps) in accordance with an example embodiment subscribes to FCAPS (fault, configuration, accounting, performance, security) data over the O1 interface and the O2 interface from E2 nodes and O-Cloud services (IMS/DMS), respectively, such as CPU Utilization for NFs, bare metal power consumption, CPU load, memory load, CPU frequency, etc.

At step S202, the rApp trains at least one AI/ML model and/or executes at least one pre-defined algorithm with data retrieved over the O1 and O2 interfaces, to produce a policy intent for energy savings in different schemes for respective nodes. Examples of policy intents include CPU frequency change, CPU load reductions, suspension of ongoing processes in O-Cloud, relocation of an application to another set of servers, putting unused servers to sleep state, etc.

At step S203, the rApp passes the intent to the NFO and/or FOCOM.

At step S204, the NFO/FOCOM translates the policy intent from the Non-RT RIC and enforces controls to the O-Cloud (e.g., transmits control data or instructions over O2 interface to IMS and/or DMS).

At step S205, the O-Cloud (e.g., IMS and/or DMS) enforces changes as dictated by the NFO/FOCOM to respective nodes and provides feedback to the SMO or the Non-RT RIC upon success or failure of policy implementation.

At step S206, the rApp monitors performance and/or configuration changes of RAN functions, NFs, and O-Cloud infrastructure for a closed loop evaluation of the policy.

2.0 Use Case 2: RAN Network and Infrastructure Load Balancing

A RAN network and infrastructure load balancing use case in accordance with an example embodiment allows the Non-RT RIC and O2 interface to support O-Cloud resource load management and E2 traffic load management based on O1 and O2 performance, configuration, and fault management data.

2.1 Background and Goal of this Use Case

Balancing traffic allows operators to distribute load across different cells of networks and provides better user experience in terms of throughput, latency, etc.

However, related art traffic steering use cases defined in O-RAN are limited to RAN traffic management and do not have any requirement or coordination with the O-Cloud to perform load management with respect to Network Functions.

A RAN network and infrastructure load balancing use case in accordance with example embodiments provides configurations for the Non-RT RIC, O2, SMO, and O-Cloud to enable an rApp (i.e., one or more rApps) to perform load balancing in both ways (i.e., RAN side and O-Cloud side). That is, the RAN network and infrastructure load balancing use case makes load balancing complete and more efficient from users' and operators' perspectives.

2.2 Entities/Resources Involved in this Use Case

The entities involved in the present use case include SMO anchored functionalities (NFO/FOCOM/OAM), which support interpretation and enforcement of policies from the Non-RT RIC, and provide necessary control to O-Cloud elements (IMS and DMS) based on a policy from the Non-RT RIC. Further, at least one rApp and the Non-RT RIC framework retrieve necessary performance, configuration, and other data from the O-Cloud over the O2 interface and/or the O1 interface to define and update policies for load balancing to SMO anchored functionalities. The O-Cloud (IMS and DMS) in accordance with the present example embodiment is configured to read control data from SMO anchored functions, enforce changes to respective nodes or hardware underneath, and provide feedback to the SMO post control enforcement.

2.3 Solution Method

Figure 3:
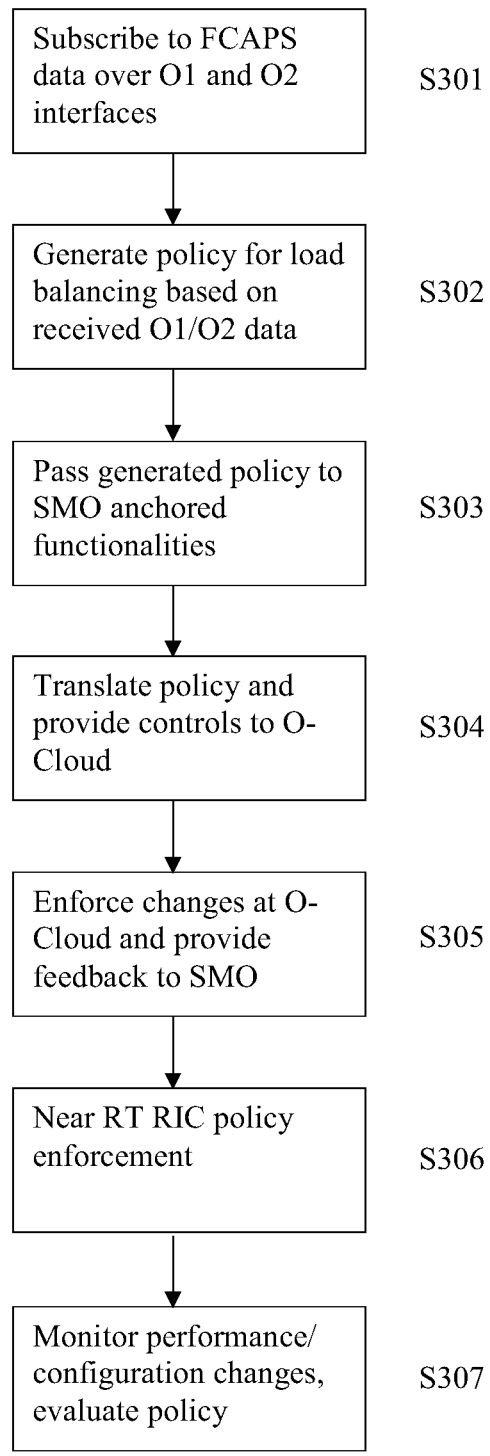
FIG. 3 illustrates a flowchart of a method of providing RAN network and infrastructure load balancing policy-based guidance for RAN network and O-Cloud infrastructure components from the Non-RT RIC via SMO anchored functionalities, in accordance with an example embodiment.

FIG. 3 illustrates a flowchart of a method of providing RAN network and infrastructure load balancing policy-based guidance for RAN network and O-Cloud infrastructure components from the Non-RT RIC via SMO anchored functionalities, in accordance with an example embodiment.

Referring to FIG. 3, at step S301, an rApp (i.e., one or more rApps) in accordance with an example embodiment subscribes to FCAPS data over the O1 interface and the O2 interface from E2 nodes and O-Cloud services (IMS/DMS), respectively, such as user mobility performance data, traffic distribution amongst cells, neighbor cell measurement data, NF configurations, NF Inventory and telemetry, etc.

At step S302, the rApp trains at least one AI/ML, model and/or executes at least one pre-defined algorithm with data retrieved over the O1 and O2 interface, to produce load balancing policy or configuration changes over O1 or O2. For example, a traffic steering policy may be produced if the NF load is high and there is a target cell available for mobility. A scale in policy for the NFO to scale in NFs to accommodate load may be produced if there are no target cells available. A traffic steering and scale out policy may be produced to move a user to another cell and perform scale out of NFs (i.e., downscale or delete instances of NFs) if NFs are less loaded.

At step S303, the rApp passes the policy to at least one SMO anchored functionalities (e.g., NFO).

At step S304, the at least one SMO anchored functionality translates the policy from the Non-RT RIC and enforces controls to the O-Cloud (e.g., transmits control data or instructions over O2 interface to IMS and/or DMS).

At step S305, the O-Cloud (e.g., IMS and/or DMS) enforces changes as dictated by the SMO to respective nodes and provides feedback to the SMO or the Non-RT RIC upon success or failure of policy implementation.

At step S306, the Near-RT RIC enforces the policy received from the Non-RT RIC.

At step S307, the rApp monitors performance of user equipment (UE), RAN functions, NFs, and O-Cloud infrastructure for an evaluation of the policy.

3.0 Use Case 3: Dynamic Allocation and Optimization of O-Cloud Resources for Network Slicing A dynamic allocation and optimization of O-Cloud resources for network slicing use case in accordance with an example embodiment allows the Non-RT RIC and O2 interface to support optimization of O-Cloud resources for a particular network slice in coordination with RAN resources based on O1 and O2 performance, configuration, and fault management data and intent defined by operators.

3.1 Background and Goal of this Use Case

Network slicing helps network providers slice a single network into multiple virtual networks built on a single infrastructure setup. Network slicing overlays these multiple virtual networks on top of a shared network. Moreover, through network slicing, each of the sliced virtual networks can be configured separately with different network attributes such as logical topology, security rules, and performance characteristics to cater to different use-cases. However, each of these sliced virtual networks is built on O-Cloud infrastructure. The features and requirements of network slices vary semi-statically or dynamically, which leads to optimizing not only radio resource management (RRM) resources but also O-Cloud infrastructure and deployment resources as well.

This use case enables an rApp to influence the NSSMF (Network Slice Subnet Management Function) and/or the NFO for optimization or rebalancing of O-Cloud infrastructure resources (scale, heal, etc.) through policy to achieve a desired SLA (service level agreement) of a particular network slice.

3.2 Entities/Resources Involved in this Use Case

The entities involved in the present use case include SMO anchored functionalities (NFO/FOCOM/OAM) as well as the NSSMF, which support interpretation and enforcement of policies from the Non-RT RIC, and provide necessary control to O-Cloud elements (IMS and DMS) based on a policy from the Non-RT RIC. Further, at least one rApp and the Non-RT RIC framework retrieve necessary performance, configuration, and other data from the O-Cloud over the O2 interface and/or the O1 interface to define and update policies for optimization and/or rebalancing of O-Cloud infrastructure resources of a particular network slice to SMO anchored functionalities and/or the NSSMF. The O-Cloud (IMS and DMS) in accordance with the present example embodiment is configured to read control data from SMO anchored functions, enforce changes to respective nodes or hardware underneath, and provide feedback to the SMO post control enforcement.

3.3 Solution Method

Figure 4:
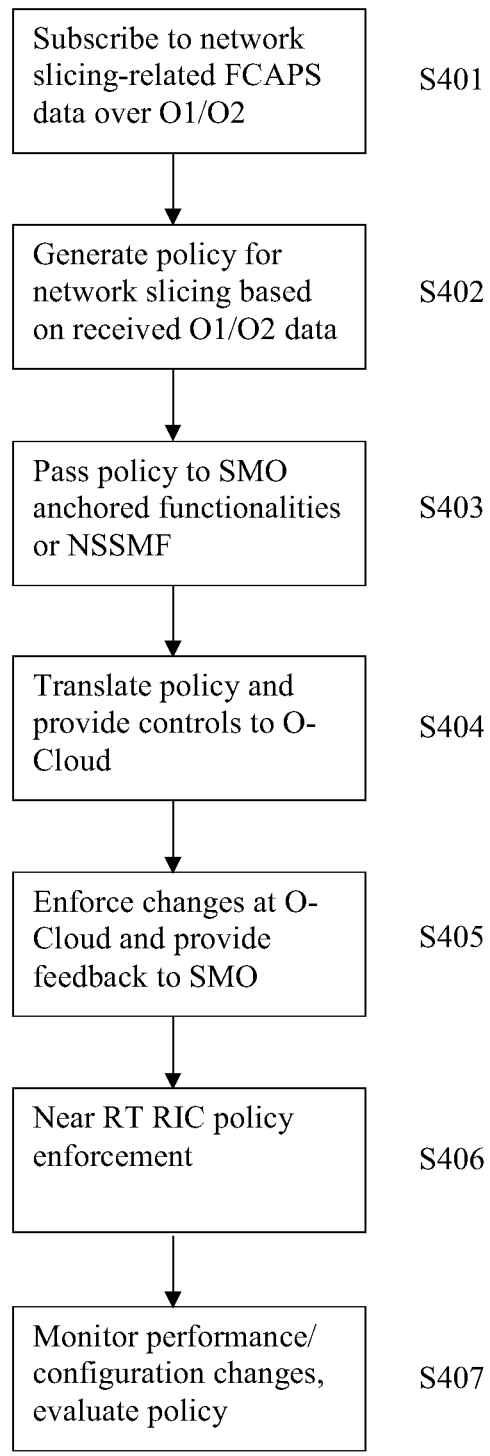
FIG. 4 illustrates a flowchart of a method of providing, from the Non-RT RIC via the NFO and/or NSSMF, policy-based guidance for optimizing and/or rebalancing O-Cloud infrastructure resources to achieve a desired service level agreement (SLA) of a network slice, in accordance with an example embodiment.

FIG. 4 illustrates a flowchart of a method of providing, from the Non-RT RIC via the NFO and/or NSSMF, policy-based guidance for optimizing and/or rebalancing O-Cloud infrastructure resources to achieve a desired SLA of a network slice, in accordance with an example embodiment.

Referring to FIG. 4, at step S401, an rApp (i.e., one or more rApps) in accordance with an example embodiment subscribes to FCAPS data over the O1 interface and the O2 interface from E2 nodes and O-Cloud services (IMS/DMS), respectively, such as network slicing related FCAPS data (slice utilization, slice throughput, slice availability, etc.), network slicing NFs LCM data, etc.

At step S402, the rApp trains at least one AI/ML model and/or executes at least one pre-defined algorithm with data retrieved over the O1 and O2 interface, to produce policies for the NSSMF and/or the NFO to perform optimizations. For example, a scale-in policy to the NFO may be produced to scale-in NFs to accommodate load if there are more requirements for NFs in terms of compute/control or memory. A scale-out policy to the NFO may be produced to scale-out NFs to accommodate load if there is a reduced requirement of NFs in terms of compute/control or memory. An AAL-LPU profiling policy may be produced to select or optimize one or more of various AAL-LPU profiles for acceleration of specific functions based on use case requirements such as URLLC, eMBB, eMTC, etc.

At step S403, the rApp passes the policy to at least one SMO anchored functionalities and/or the NSSMF.

At step S404, the at least one SMO anchored functionality and/or the NSSMF translate the policy from the Non-RT RIC and enforce controls to the O-Cloud (e.g., transmits control data or instructions over O2 interface to IMS and/or DMS).

At step S405, the O-Cloud (e.g., IMS and/or DMS) enforces changes as dictated by the SMO and/or NSSMF to respective nodes and provides feedback to the SMO/NSSMF or the Non-RT RIC upon success or failure of policy implementation.

At step S406, the Near-RT RIC enforces the policy received from the Non-RT RIC.

At step S407, the rApp monitors performance of UE, Network Slice, RAN functions, NFs and O-Cloud infrastructure for evaluation of the policy.

4.0 Use Case 4: O-Cloud Resource Management and SLA Assurance for RAN Sharing

An O-Cloud resource management and SLA assurance for RAN sharing use case in accordance with an example embodiment enables multiple operators to share the same O-RAN infrastructure, while allowing the operators to remotely configure and control the shared resources via remote O1, O2 and E2 interfaces.

4.1 Background and Goal of this Use Case

RAN sharing provides the possibility for an operator (Operator A or home operator) to share a network infrastructure with another operator (Operator B or visitor operator). An example embodiment allows the Operator B to configure and control resources in an infrastructure that is owned by Operator A. In this scenario, the adoption of the O-RAN architecture can facilitate the remote control and configuration of such VNFs. Indeed, Operator B can monitor and control the remote O-DU via the Near-RT RIC of site B, using a "remote" E2 interface, while all the remote VNF configuration procedures can be handled by a specific rApp of the Non-RT RIC, located at the SMO of each operator.

An rApp in accordance with the present example embodiment reads a SLA from Operator B via a remote interface that defines various requirements for operator B on the infrastructure of Operator A, to thereby optimize O-Cloud and RAN resources to achieve an expected SLA through a policy mechanism.

4.2 Entities/Resources Involved in this Use Case

The entities involved in the present use case include SMO anchored functionalities (NFO/FOCOM/OAM), which support interpretation and enforcement of policies from the Non-RT RIC, and provide necessary control to O-Cloud elements (IMS and DMS) based on a policy from the Non-RT RIC. Further, at least one rApp and the Non-RT RIC framework retrieve necessary performance, configuration, and other data from the O-Cloud over the O2 interface and/or the O1 interface to define and update policies for optimization of RAN sharing to SMO anchored functionalities. The Near-RT RIC framework supports interpretation and execution of intents and policies from the Non-RT RIC to derive the RAN sharing optimization at the RAN level in terms of expected behavior, and sends use case performance reports to the Non-RT RIC for evaluation and optimization. The O-Cloud (IMS and DMS) in accordance with the present example embodiment is configured to read control data from SMO anchored functions, enforce changes to respective nodes or hardware underneath, and provide feedback to the SMO post control enforcement. The RAN nodes support and provide network state and UE performance reports with required granularity to the SMO over the O1 interface, and support policy enforcement based on messages from the A1 and/or E2 interfaces, which are expected to influence RRM behavior.

4.3 Solution Method

Figure 5:
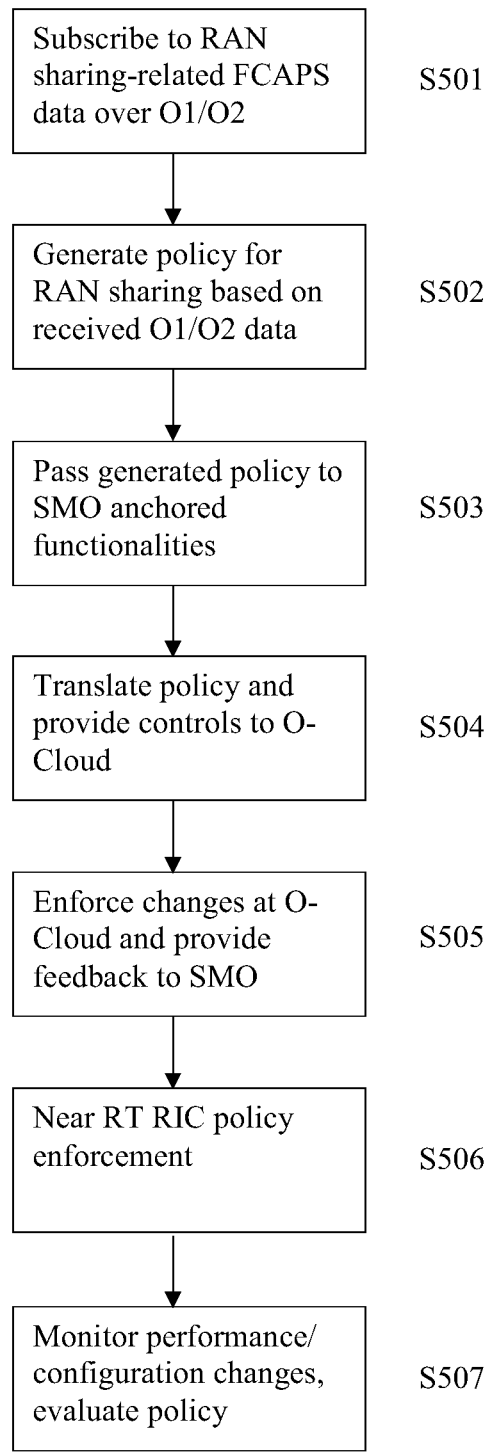
FIG. 5 illustrates a flowchart of a method of providing, from the Non-RT RIC via SMO anchored functionalities, policy-based guidance for optimizing O-Cloud and RAN resources to achieve a desired SLA for RAN sharing, in accordance with an example embodiment.

FIG. 5 illustrates a flowchart of a method of providing, from the Non-RT RIC via SMO anchored functionalities, policy-based guidance for optimizing O-Cloud and RAN resources to achieve a desired SLA for RAN sharing, in accordance with an example embodiment.

Referring to FIG. 5, at step S501, an rApp (i.e., one or more rApps) in accordance with an example embodiment subscribes to FCAPS data over the O1 interface and the O2 interface from E2 nodes and O-Cloud services (IMS/DMS), respectively, such as RAN sharing related FCAPS data (slice level data, current utilization of infrastructure resources, etc.).

At step S502, the rApp trains at least one AI/ML model and/or executes at least one pre-defined algorithm with data retrieved over the O1 and O2 interface, to produce policies for SMO anchored functionalities (e.g., the FOCOM and/or the NFO) to perform optimizations. For example, a scale-in policy to the NFO may be produced to scale-in NFs to accommodate load if there are more requirements for NFs in terms of compute/control or memory. A scale-out policy to the NFO may be produced to scale-out NFs to accommodate load if there is a reduced requirement of NFs in terms of compute/control or memory. An AAL-LPU profiling policy may be produced to select or optimize one or more of various AAL-LPU profiles for acceleration of specific functions based on use case requirements such as URLLC, eMBB, eMTC, etc. An NF reconfiguration policy may be produced based on O1 data.

At step S503, the rApp passes the policy to at least one SMO anchored functionalities.

At step S504, the at least one SMO anchored functionality translates the policy from the Non-RT RIC and enforces controls to the O-Cloud (e.g., transmits control data or instructions over O2 interface to IMS and/or DMS).

At step S505, the O-Cloud (e.g., IMS and/or DMS) enforces changes as dictated by the SMO to respective nodes and provides feedback to the SMO/NSSMF or the Non-RT RIC upon success or failure of policy implementation.

At step S506, the Near-RT RIC enforces a policy received from the Non-RT RIC.

At step S507, the rApp monitors performance of UE, Network Slice, RAN functions, NFs and O-Cloud infrastructure for evaluation of the policy.

5.0 Use Case 5: Infrastructure Network Elements Healing

An infrastructure and network elements healing use case in accordance with an example embodiment allows operators to define different healing scenarios for various O-RAN elements such as network functions deployed over the O-Cloud and O-Cloud Infrastructure.

5.1 Background and Goal of this Use Case

Network healing is becoming critical for running cloud native operations in the mobile network for mobile operators. Network healing involves monitoring the network elements' fault and performance data, receiving fault events that mark the undesired state of the network elements, analyzing the defined policy action for that fault, correlating with the topology of events, and passing the right policy action intent to bring the network application live again. Related art network healing features deployed in network equipment are limited and vendor specific.

An infrastructure and network elements healing use case in accordance with example embodiments provides various options over the Non-RT RIC platform and rApps to enable network element healing features for RAN network functions deployed over the O-Cloud and O-Cloud Infrastructure.

5.2 Entities/Resources Involved in this Use Case

The entities involved in the present use case include SMO anchored functionalities (NFO/FOCOM/OAM), which support interpretation and enforcement of policies from the Non-RT RIC, and provide necessary control to O-Cloud elements (IMS and DMS) based on a policy intent from the Non-RT RIC. Further, at least one rApp and the Non-RT RIC framework retrieve necessary performance, configuration, and other data from the O-Cloud over the O2 interface and/or from NFs over the O1 interface to define and update a desired policy intent for healing to SMO anchored functionalities. The O-Cloud (IMS and DMS) in accordance with the present example embodiment is configured to read control data from SMO anchored functions, enforce changes to respective nodes or hardware underneath, and provide feedback to the SMO post control enforcement.

5.3 Solution Method

Figure 6:
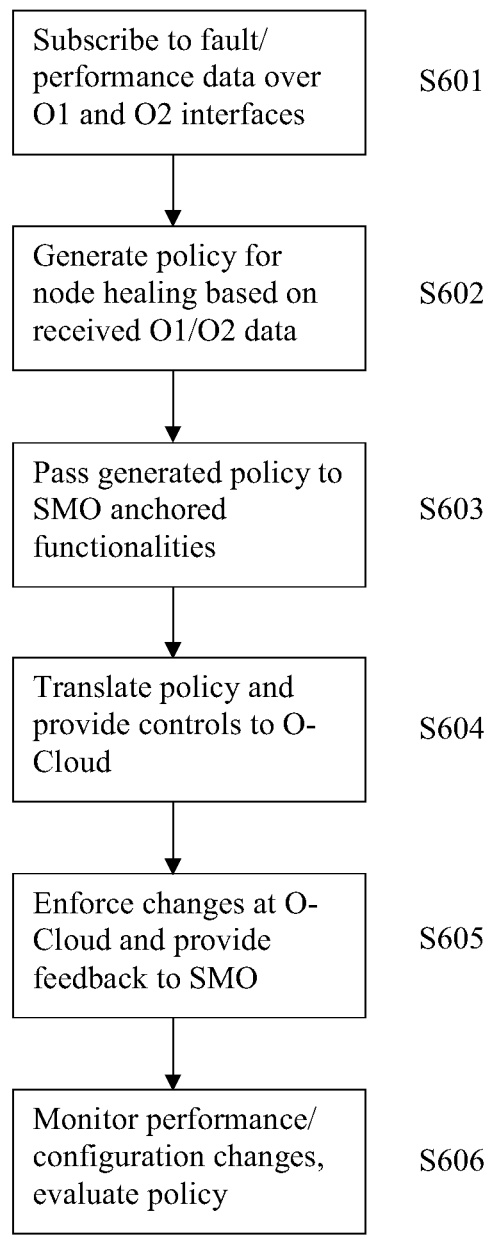
FIG. 6 illustrates a flowchart of a method of providing network element healing policy-based guidance from the Non-RT RIC via SMO anchored functionalities, in accordance with an example embodiment.

FIG. 6 illustrates a flowchart of a method of providing network element healing policy-based guidance from the Non-RT MC via SMO anchored functionalities, in accordance with an example embodiment.

Referring to FIG. 6, at step S601, an rApp (i.e., one or more rApps) in accordance with an example embodiment subscribes to FCAPS data over the O1 interface and the O2 interface from E2 nodes and O-Cloud services (IMS/DMS), respectively, such as O-Cloud fault/performance data, NFs fault/performance data (e.g., NF_faulted, NF_deployment_failed, Hardware_failure, etc.), etc.

At step S602, the rApp trains at least one AI/ML, model and/or executes at least one pre-defined algorithm with data retrieved over the O1 and O2 interface, to produce desired a policy intent for healing in different schemes for respective nodes. For example, if an application goes down and a fault event of the respective application is received by the rApp, the rApp in accordance with an example embodiment evaluates the possible root cause based on defined algorithms and produces the policy action intent (such as restart the application, relocate the application to different server, increase the resource limitation for the application, etc.). By way of another example, if a hardware goes down and a fault event of the respective hardware is received by rApp, then rApp in accordance with an example embodiment evaluates the possible root cause based on defined algorithms and produces the policy action intent (such as reboot the hardware and relocate the applications to different server and, if the issue persists after rebooting the hardware, raise a hardware maintenance ticket in an incident management module).

At step S603, the rApp passes the policy to at least one SMO anchored functionalities (e.g., NFO or FOCOM).

At step S604, the at least one SMO anchored functionality translates the policy from the Non-RT RIC to enforce controls to the O-Cloud (e.g., transmits control data or instructions over O2 interface to IMS and/or DMS, and/or via an API to take the desired action such as restart of hardware, relocation of application to a different server, etc.).

At step S605, the O-Cloud (e.g., IMS and/or DMS) enforces changes as dictated by the SMO (NFO/FOCOM) to respective applications and/or hardware and provides feedback to the SMO or the Non-RT RIC upon success or failure of policy implementation.

At step S606, the rApp monitors performance and/or configuration changes of RAN NFs and O-Cloud infrastructure for a closed loop evaluation of the policy and to determine whether to take follow-up actions such as raising an incident ticket.

6.0 Use Case 6: Infrastructure Network Troubleshooting

An infrastructure network troubleshooting use case in accordance with an example embodiment allows mobile network operators to find out the root cause of fault events and performance degradations of network elements based on AI/ML algorithms and correlation of data from network functions and O-Cloud Infrastructure.

6.1 Background and Goal of this Use Case

Due to complex virtual application deployment scenarios, manually finding the root cause of a fault event or performance degradation is a very time-consuming process and could result in a network outage for long periods of time when there is delay in fixing the issue. Automatically finding the root cause involves monitoring the network element's fault and performance data, performing the root cause analysis using AI/ML algorithms and correlation of data from various layers, drilling down to the exact cause of the problem, and taking appropriate action.

An infrastructure network troubleshooting use case in accordance with an example embodiment provides various options over the Non-RT RIC platform and rApps to enable a network element problem's root cause analysis for RAN network functions deployed over the O-Cloud and O-Cloud Infrastructure.

6.2 Entities/Resources Involved in this Use Case

The entities involved in the present use case include SMO anchored functionalities (NFO/FOCOM/OAM), which support interpretation and enforcement of policies from the Non-RT RIC, and provide necessary control to O-Cloud elements (IMS and DMS) based on a policy from the Non-RT RIC. Further, an incident management tool is provided through which network incidents are raised so that respective operational teams can act thereon. Moreover, at least one rApp and the Non-RT RIC framework retrieve necessary fault and performance data from NFs over the O1 interface and from the O-Cloud over the O2 interface to define and update policy intents for root cause analysis to SMO anchored functionalities. The O-Cloud (IMS and DMS) in accordance with the present example embodiment is configured to read control data from SMO anchored functions, enforce changes to respective nodes or hardware underneath, and provide feedback to the SMO post control enforcement.

6.3 Solution Method

Figure 7:
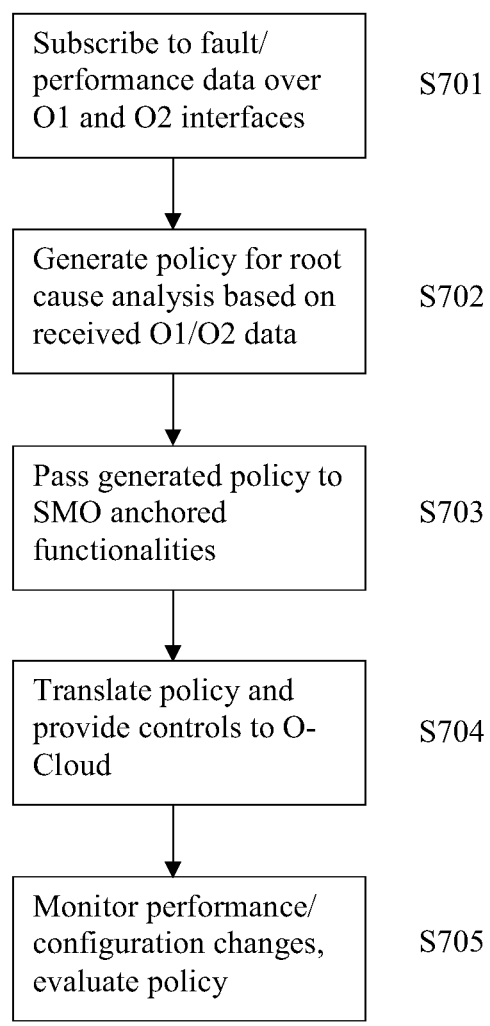
FIG. 7 illustrates a flowchart of a method of providing, from the Non-RT RIC via SMO anchored functionalities, root cause analysis policy-based guidance for determining the root cause of fault events and/or performance degradations of network elements, in accordance with an example embodiment.

FIG. 7 illustrates a flowchart of a method of providing, from the Non-RT RIC via SMO anchored functionalities, root cause analysis policy-based guidance for determining the root cause of fault events and/or performance degradations of network elements, in accordance with an example embodiment.

Referring to FIG. 7, at step S701, an rApp (i.e., one or more rApps) in accordance with an example embodiment subscribes to FCAPS data over the O1 interface and the O2 interface from E2 nodes and O-Cloud services (IMS/DMS), respectively, such as O-Cloud fault/performance data, NFs fault/performance data (e.g., CPU_utilization, Memory_utilization, fan failure, NF_faulted, NF_deployment_failed, Hardware_failure, etc.), etc.

At step S202, the rApp trains at least one AI/ML model and/or executes at least one pre-defined algorithm with data retrieved over the O1 and O2 interfaces, to correlate the data and drill down or determine the exact root cause schemes for a respective node. For example, if an application performance is determined to be degraded below a threshold, this performance KPI will be received by the rApps. The rApp then evaluates the possible root cause based on defined algorithms (e.g., over utilization of CPU on the O-Cloud, memory, checking how many applications are deployed on the same cloud, correlating performance of all applications on the same cloud and making out that over allocation of CPU is the root cause, raising the incident of the root cause and suggesting an action to add more compute to the O-Cloud). By way of another example, if an application is not reachable, then the rApp will evaluate the possible root cause by finding the O-Cloud component or node where this application is deployed, checking whether there is an issue in the O-Cloud infrastructure by correlating with the relevant fault events from the infrastructure, raising a ticket in the incident manager for this hardware issue and passing a policy intent to the NFO/FOCOM to deploy the application on a different O-Cloud component (e.g., server or node).

At step S703, the rApp passes the intent to the NFO and/or FOCOM and/or raises an incident ticket for the root cause analysis.

At step S704, the NFO/FOCOM translates the policy intent from the Non-RT RIC and enforces controls to the O-Cloud (e.g., transmits control data or instructions over O2 interface to IMS and/or DMS, and/or via an API to take the desired action). If the incident is raised in the incident management module, an operational team is notified and can immediately act on the root cause to resolve the problem.

At step S705, the rApp monitors performance and/or configuration changes of RAN NFs and O-Cloud infrastructure for correlation of data over time.

Figure 8:
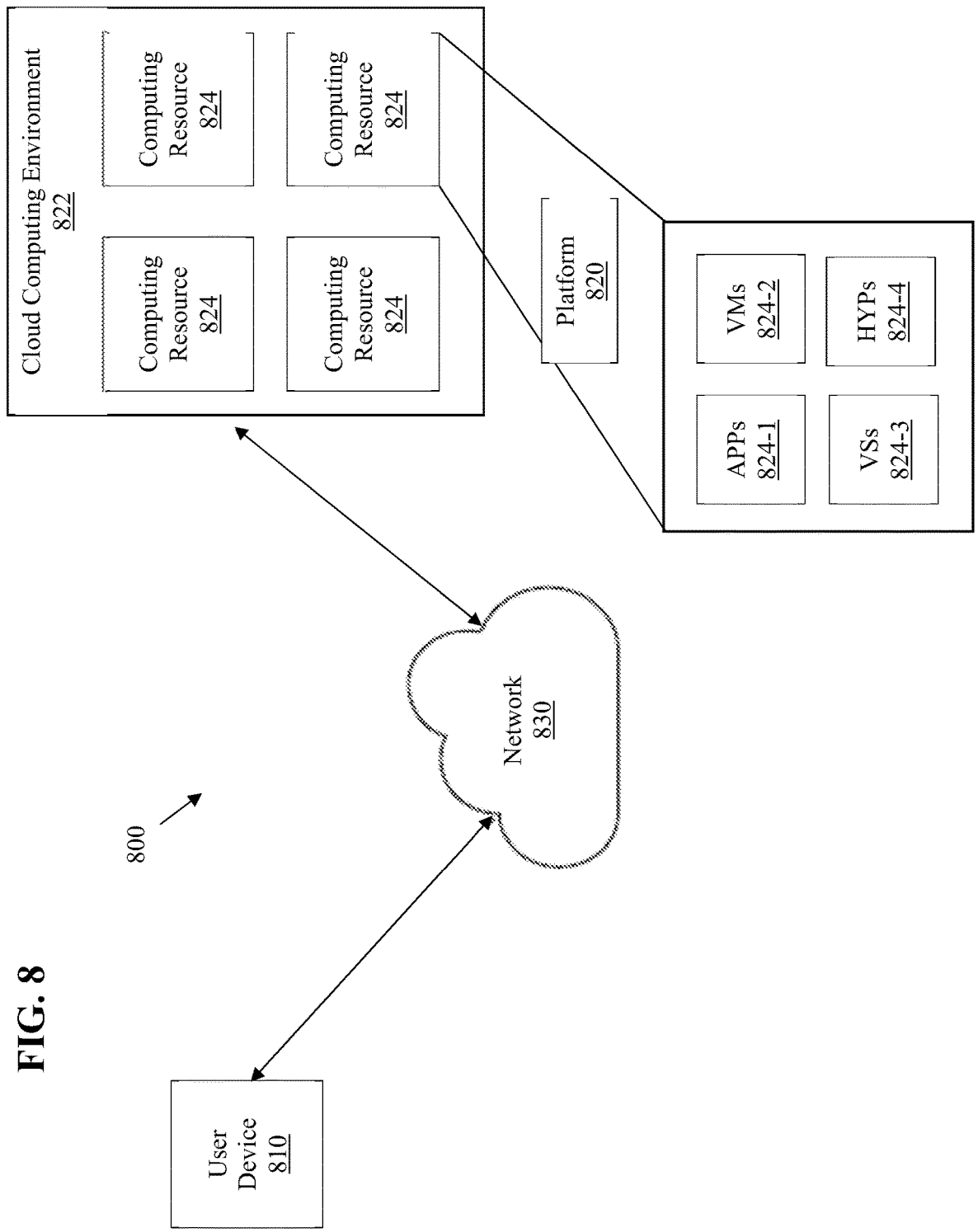
FIG. 8 is a diagram of an example environment in which systems and/or methods, described herein, may be implemented.

FIG. 8 is a diagram of an example environment 800 in which systems and/or methods, described herein, may be implemented. As shown in FIG. 8, environment 800 may include a user device 810, a platform 820, and a network 830. Devices of environment 800 may interconnect via wired connections, wireless connections, or a combination of wired and wireless connections. In embodiments, any of the functions and operations described with reference to FIGS. 1 through 7 may be performed by any combination of elements illustrated in FIG. 8.

User device 810 includes one or more devices capable of receiving, generating, storing, processing, and/or providing information associated with platform 820. For example, user device 810 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 810 may receive information from and/or transmit information to platform 820.

Platform 820 includes one or more devices capable of receiving, generating, storing, processing, and/or providing information. In some implementations, platform 820 may include a cloud server or a group of cloud servers. In some implementations, platform 820 may be designed to be modular such that certain software components may be swapped in or out depending on a particular need. As such, platform 820 may be easily and/or quickly reconfigured for different uses.

In some implementations, as shown, platform 820 may be hosted in cloud computing environment 822. Notably, while implementations described herein describe platform 820 as being hosted in cloud computing environment 822, in some implementations, platform 820 may not be cloud-based (i.e., may be implemented outside of a cloud computing environment) or may be partially cloud-based.

Cloud computing environment 822 includes an environment that hosts platform 820. Cloud computing environment 822 may provide computation, software, data access, storage, etc. services that do not require end-user (e.g., user device 810) knowledge of a physical location and configuration of system(s) and/or device(s) that hosts platform 820. As shown, cloud computing environment 822 may include a group of computing resources 824 (referred to collectively as "computing resources 824" and individually as "computing resource 824").

Computing resource 824 includes one or more personal computers, a cluster of computing devices, workstation computers, server devices, or other types of computation and/or communication devices. In some implementations, computing resource 824 may host platform 820. The cloud resources may include compute instances executing in computing resource 824, storage devices provided in computing resource 824, data transfer devices provided by computing resource 824, etc. In some implementations, computing resource 824 may communicate with other computing resources 824 via wired connections, wireless connections, or a combination of wired and wireless connections.

As further shown in FIG. 8, computing resource 824 includes a group of cloud resources, such as one or more applications ("APPs") 824-1, one or more virtual machines ("VMs") 824-2, virtualized storage ("VSs") 824-3, one or more hypervisors ("HYPs") 824-4, or the like.

Application 824-1 includes one or more software applications that may be provided to or accessed by user device 810. Application 824-1 may eliminate a need to install and execute the software applications on user device 810. For example, application 824-1 may include software associated with platform 820 and/or any other software capable of being provided via cloud computing environment 822. In some implementations, one application 824-1 may send/receive information to/from one or more other applications 824-1, via virtual machine 824-2.

Virtual machine 824-2 includes a software implementation of a machine (e.g., a computer) that executes programs like a physical machine. Virtual machine 824-2 may be either a system virtual machine or a process virtual machine, depending upon use and degree of correspondence to any real machine by virtual machine 824-2. A system virtual machine may provide a complete system platform that supports execution of a complete operating system ("OS"). A process virtual machine may execute a single program, and may support a single process. In some implementations, virtual machine 824-2 may execute on behalf of a user (e.g., user device 810), and may manage infrastructure of cloud computing environment 822, such as data management, synchronization, or long-duration data transfers.

Virtualized storage 824-3 includes one or more storage systems and/or one or more devices that use virtualization techniques within the storage systems or devices of computing resource 824. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 824-4 may provide hardware virtualization techniques that allow multiple operating systems (e.g., "guest operating systems") to execute concurrently on a host computer, such as computing resource 824. Hypervisor 824-4 may present a virtual operating platform to the guest operating systems, and may manage the execution of the guest operating systems. Multiple instances of a variety of operating systems may share virtualized hardware resources.

Network 830 includes one or more wired and/or wireless networks. For example, network 830 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 8 are provided as an example. In practice, there may be additional devices and/or networks, fewer devices and/or networks, different devices and/or networks, or differently arranged devices and/or networks than those shown in FIG. 8. Furthermore, two or more devices shown in FIG. 8 may be implemented within a single device, or a single device shown in FIG. 8 may be implemented as multiple, distributed devices. Additionally, or alternatively, a set of devices (e.g., one or more devices) of environment 800 may perform one or more functions described as being performed by another set of devices of environment 800.

Figure 9:
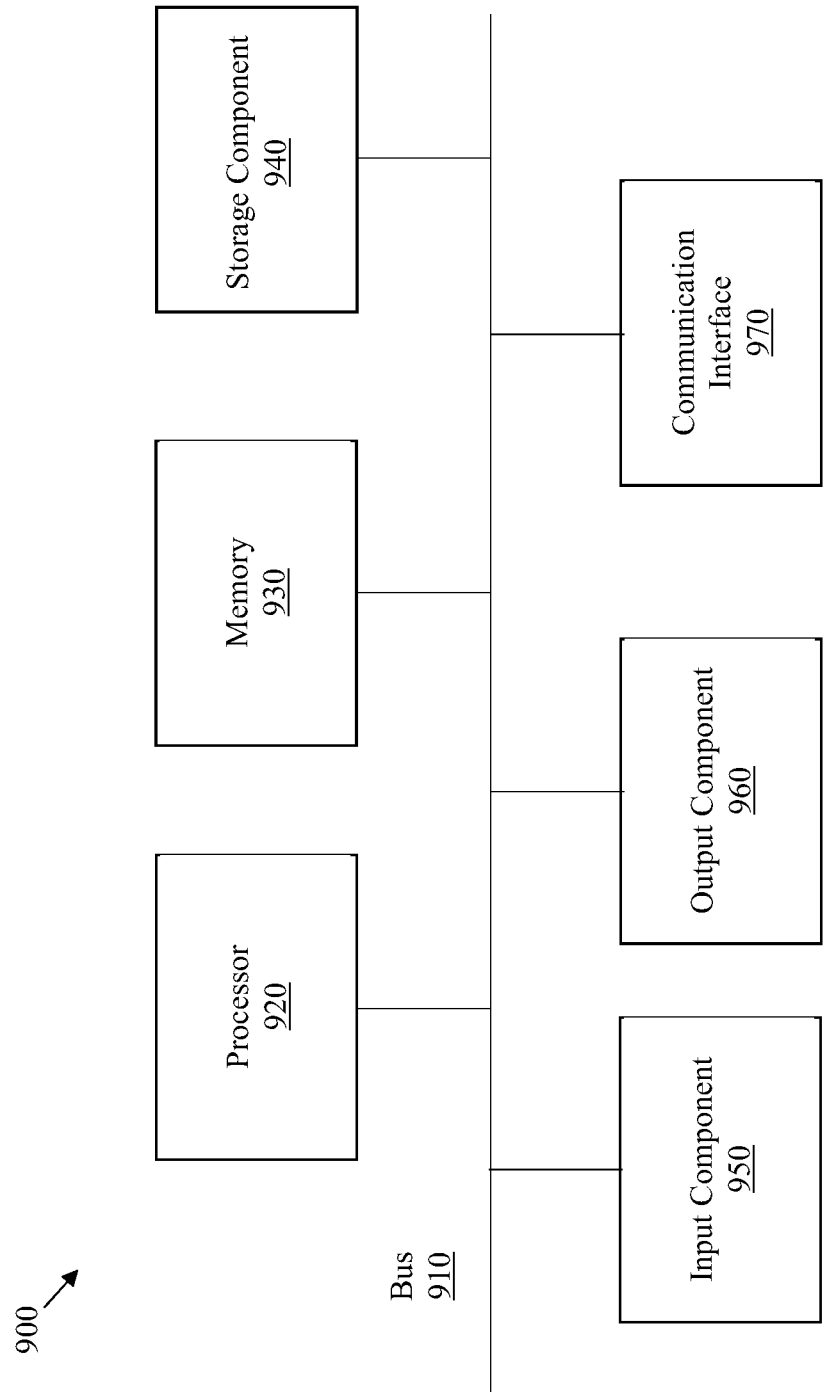
FIG. 9 is a diagram of example components of a device according to an embodiment.

FIG. 9 is a diagram of example components of a device 900. Device 900 may correspond to user device 810 and/or platform 820. As shown in FIG. 9, device 900 may include a bus 910, a processor 920, a memory 930, a storage component 940, an input component 950, an output component 960, and a communication interface 970.

Bus 910 includes a component that permits communication among the components of device 900. Processor 920 may be implemented in hardware, firmware, or a combination of hardware and software. Processor 920 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 920 includes one or more processors capable of being programmed to perform a function. Memory 930 includes a random access memory (RAM), a read only memory (ROM), and/or another type of dynamic or static storage device (e.g., a flash memory, a magnetic memory, and/or an optical memory) that stores information and/or instructions for use by processor 920.

Storage component 940 stores information and/or software related to the operation and use of device 900. For example, storage component 940 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 950 includes a component that permits device 900 to receive information, such as via user input (e.g., a touch screen display, a keyboard, a keypad, a mouse, a button, a switch, and/or a microphone). Additionally, or alternatively, input component 950 may include a sensor for sensing information (e.g., a global positioning system (GPS) component, an accelerometer, a gyroscope, and/or an actuator). Output component 960 includes a component that provides output information from device 900 (e.g., a display, a speaker, and/or one or more light-emitting diodes (LEDs)).

Communication interface 970 includes a transceiver-like component (e.g., a transceiver and/or a separate receiver and transmitter) that enables device 900 to communicate with other devices, such as via a wired connection, a wireless connection, or a combination of wired and wireless connections. Communication interface 970 may permit device 900 to receive information from another device and/or provide information to another device. For example, communication interface 970 may include an Ethernet interface, an optical interface, a coaxial interface, an infrared interface, a radio frequency (RF) interface, a universal serial bus (USB) interface, a Wi-Fi interface, a cellular network interface, or the like.

Device 900 may perform one or more processes described herein. Device 900 may perform these processes in response to processor 920 executing software instructions stored by a non-transitory computer-readable medium, such as memory 930 and/or storage component 940. A computer-readable medium is defined herein as a non-transitory memory device. A memory device includes memory space within a single physical storage device or memory space spread across multiple physical storage devices.

Software instructions may be read into memory 930 and/or storage component 940 from another computer-readable medium or from another device via communication interface 970. When executed, software instructions stored in memory 930 and/or storage component 940 may cause processor 920 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 9 are provided as an example. In practice, device 300 may include additional components, fewer components, different components, or differently arranged components than those shown in FIG. 9. Additionally, or alternatively, a set of components (e.g., one or more components) of device 900 may perform one or more functions described as being performed by another set of components of device 900.

In some embodiments, any one of the operations or processes of FIGS. 1 through 7 may be implemented by or using any one of the elements illustrated in FIGS. 8 and 9.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features from one or more embodiments may be combined with one or more features of one or more other embodiments described above.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function (s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A system for implementing a Service Management and Orchestration (SMO) framework for managing and orchestrating an Open Radio Access Network (O-RAN) Cloud (O-Cloud) platform, the system comprising:
at least one memory storing first instructions and second instructions;
at least one first processor configured to execute the first instructions to implement a non-real-time radio access network (RAN) intelligent controller (Non-RT RIC) hosting a plurality of applications (rApps); and
at least one second processor configured to execute the second instructions to implement SMO anchored functionalities,
wherein the at least one first processor is configured to execute the first instructions to:
obtain O1 data received over an O1 interface of the SMO framework, the O1 interface for communication with virtualized network functions (VNFs) hosted in a plurality of physical nodes of the O-Cloud platform,
obtain O2 data received over an O2 interface of the SMO framework, the O2 interface for communication with Infrastructure Management Services (IMS) and Deployment Management Services (DMS) of the O-Cloud platform, and
train and deploy at least one artificial intelligence/machine learning (AI/ML) model to generate, by a rApp from among the plurality of applications and based on at least one of the O1 data and the O2 data, a policy for optimizing the O-Cloud platform or the VNFs via the SMO anchored functionalities or the O1 interface of the SMO framework, and
wherein the at least one second processor is configured to execute the second instructions to receive and manage the policy from the Non-RT RIC, and generate optimization controls for transmission to the O-Cloud platform via the O2 interface or transmit the policy to the IMS and DMS via the O2 interface for implementation, and
wherein the O2 data comprises O-Cloud inventory and telemetry data on node level or O-Cloud level.

2. The system as claimed in claim 1, wherein the at least one first processor is configured to execute the first instructions to obtain feedback from the O-Cloud platform or the VNFs to evaluate the policy.

3. The system as claimed in claim 1, wherein the O1 data comprises fault, configuration, accounting, performance, security (FCAPS) data.

4. The system as claimed in claim 1, wherein the SMO anchored functionalities comprise a Network Function Orchestrator (NFO) and a Federated O-Cloud Orchestration and Management (FOCOM).

5. The system as claimed in claim 1, wherein:
the at least one of the O1 data and the O2 data comprises data on at least one of central processing unit (CPU) utilization for network functions (NFs), bare metal power consumption, CPU load, memory load, and CPU frequency; and
the policy is for energy savings for at least one of NFs, O-Cloud infrastructure, and O-Cloud hardware.

6. The system as claimed in claim 1, wherein:
the at least one of the O1 data and the O2 data comprises data on at least one of user mobility performance, traffic distribution among cells, neighbor cell measurements, NF configurations, NF inventory, and NF telemetry; and
the policy is for RAN network or infrastructure load balancing.

7. The system as claimed in claim 1, wherein:
the at least one of the O1 data and the O2 data comprises data on at least one of network slice utilization, network slice throughput, network slice availability, and network slicing life cycle management (LCM); and
the policy is for dynamic allocation and optimization of O-Cloud resources for network slicing.

8. The system as claimed in claim 1, wherein:
the at least one of the O1 data and the O2 data comprises RAN sharing-related FCAPS data; and
the policy is for O-Cloud resource management and service level agreement (SLA) assurance for RAN sharing.

9. The system as claimed in claim 1, wherein:
the at least one of the O1 data and the O2 data comprises at least one of O-Cloud fault data, O-Cloud performance data, NF fault data, and NF performance data; and
the policy is for O-Cloud or O-Cloud infrastructure network elements healing or root cause analysis of performance degradation or faults.

10. A method for optimizing O-Cloud resources using policy-based guidance from a non-real-time radio access network (RAN) intelligent controller (Non-RT RIC), the method comprising:
obtaining, by an application (rApp) hosted in the Non-RT RIC, O1 data received over an O1 interface of a Service Management and Orchestration (SMO) framework for managing and orchestrating an Open Radio Access Network (O-RAN) Cloud (O-Cloud) platform, the O1 interface for communication with virtualized network functions (VNFs) hosted in a plurality of physical nodes of the O-Cloud platform;
obtaining, by the rApp, O2 data received over an O2 interface of the SMO framework, the O2 interface for communication with Infrastructure Management Services (IMS) and Deployment Management Services (DMS) of the O-Cloud platform;
training and deploy at least one artificial intelligence/machine learning (AI/ML) model to generate, by the rApp and based on at least one of the O1 data and the O2 data, a policy for optimizing the O-Cloud platform or the VNFs via SMO anchored functionalities or the O1 interface of the SMO framework; and
providing the policy to the SMO anchored functionalities for implementation, or performing configuration changes for optimizing O-Cloud resources via the O2 interface,
wherein the O2 data comprises O-Cloud inventory and telemetry data on node level or O-Cloud level.

11. The method as claimed in claim 10, further comprising obtaining, by the rApp, feedback from the O-Cloud platform or the VNFs to evaluate the policy.

12. The method as claimed in claim 10, wherein the O1 data comprises fault, configuration, accounting, performance, security (FCAPS) data.

13. At least one non-transitory computer-readable recording medium having recorded thereon instructions executable by at least one processor to perform a method for optimizing O-Cloud resources using policy-based guidance from a non-real-time radio access network (RAN) intelligent controller (Non-RT RIC), the method comprising:
obtaining, by an application (rApp) hosted in the Non-RT RIC, O1 data received over an O1 interface of a Service Management and Orchestration (SMO) framework for managing and orchestrating an Open Radio Access Network (O-RAN) Cloud (O-Cloud) platform, the O1 interface for communication with virtualized network functions (VNFs) hosted in a plurality of physical nodes of the O-Cloud platform;
obtaining, by the rApp, O2 data received over an O2 interface of the SMO framework, the O2 interface for communication with Infrastructure Management Services (IMS) and Deployment Management Services (DMS) of the O-Cloud platform;
training and deploy at least one artificial intelligence/machine learning (AI/ML) model to generate, by the rApp and based on at least one of the O1 data and the O2 data, a policy for optimizing the O-Cloud platform or the VNFs via SMO anchored functionalities or the O1 interface of the SMO framework; and
providing the policy to the SMO anchored functionalities for implementation, or performing configuration changes for optimizing O-Cloud resources via the O2 interface,
wherein the O2 data comprises O-Cloud inventory and telemetry data on node level or O-Cloud level.

14. The at least one non-transitory computer-readable recording medium as claimed in claim 13, wherein the method further comprises obtaining, by the rApp, feedback from the O-Cloud platform or the VNFs to evaluate the policy.

15. The at least one non-transitory computer-readable recording medium as claimed in claim 13, wherein:
the O1 data comprises fault, configuration, accounting, performance, security (FCAPS) data.

* * * * *